United States Patent [19]
Chen

[11] Patent Number: 6,036,013
[45] Date of Patent: Mar. 14, 2000

[54] SCREW FEED BELT

[76] Inventor: Sen-Yang Chen, No. 155, Huei-Min St., Nan-Tzu Dist., Kaohsiung City, Taiwan

[21] Appl. No.: 09/249,763

[22] Filed: Feb. 16, 1999

[51] Int. Cl.[7] .................................................. B65D 85/24
[52] U.S. Cl. .......................................... 206/347; 411/442
[58] Field of Search ................................... 206/338, 343, 206/346, 347, 820; 411/442, 444

[56] References Cited

U.S. PATENT DOCUMENTS

| | | | |
|---|---|---|---|
| 3,904,032 | 9/1975 | Maier | 206/347 |
| 3,944,068 | 3/1976 | Maier et al. | 206/347 |
| 3,955,674 | 5/1976 | Maier et al. | 206/347 |
| 4,019,631 | 4/1977 | Lejdegard et al. | 206/347 |
| 4,903,831 | 2/1990 | Francis | 206/347 |
| 5,522,687 | 6/1996 | Chen | 206/347 |
| 5,713,709 | 2/1998 | Huang | 206/347 |

*Primary Examiner*—Jim Foster
*Attorney, Agent, or Firm*—Greenblum & Bernstein, P.L.C.

[57] ABSTRACT

A screw feed belt is used to hold a plurality of screws and includes an elongated strap, a plurality of positioning rings, and a plurality of connecting ribs. The strap is made of a flexible material and is formed with a plurality of spaced-apart and aligned openings, each of which is defined by an annular confining wall. The positioning rings are disposed respectively in the openings. Each of the positioning rings has an inner periphery that defines a positioning hole adapted to permit extension of the shank portion of one of the screws and that is adapted to be in frictional contact with the shank portion, and an outer periphery surrounded by and spaced-apart from the confining wall of the respective opening. The positioning hole has a size smaller than the head portion of the screws so that the positioning ring is adapted to permit the head portion to rest thereon when the screw extends through the positioning hole. The connecting ribs extend radially and integrally between the outer periphery of a respective positioning ring and the confining wall of a corresponding opening. The connecting ribs are breakable to permit the respective positioning ring and the screw that extends through the respective positioning ring to separate from the strap when the screw is rotated axially by a screw driving machine.

1 Claim, 3 Drawing Sheets

SCREW FEED BELT

BACKGROUND OF THE INVENTION

1. Field of the Invention

This invention relates to a screw feed belt, more particularly to a screw feed belt which simplifies the screw driving operation by obviating the need for sleeving washers on screws.

2. Description of the Related Art

A screw feed belt has been used for gathering and holding a plurality of screws to facilitate the screw driving operation. FIG. 1 illustrates a conventional screw feed belt 1 which includes an elongated strap formed with a plurality of pairs of guiding notches 10 on two longitudinal sides thereof, and a plurality of aligned and spaced positioning holes 11 to permit extension of the shank portions of screws 2 (only one is shown in FIG. 2) therethrough. As shown in FIG. 2, each of the positioning holes 11 is defined by a tapering first annular wall 12 that converges downwardly, and a second annular wall 13 that extends downwardly from the first annular wall 12. The second annular wall 13 has an inner surface formed with a radial inwardly projecting rim 14. When the screw 2 extends into one of the positioning holes 11, the screw thread formed on the shank portion of the screw 2 engages the rim 14 for positioning the screw 2 in the positioning hole 11.

However, the conventional screw feed belt 1 is only suitable for holding a screw that has a tapered head portion 200 and that does not require a washer for use therewith. When another type of screw that requires a washer is to be operated, a plurality of the washers must be sleeved one by one on the screws before the screws are held on the screw feed belt 1. This complicates the screw driving operation.

SUMMARY OF THE INVENTION

Therefore, the object of the present invention is to provide a screw feed belt which simplifies the screw driving operation.

Accordingly, the screw feed belt of the present invention is adapted for holding a plurality of screws and includes an elongated strap, a plurality of positioning rings, and a plurality of connecting ribs. The elongated strap is made of a flexible material and is formed with a plurality of spaced-apart and aligned openings, each of which is defined by an annular confining wall. The positioning rings are disposed respectively in the openings. Each of the positioning rings has an inner periphery that defines a positioning hole adapted to permit extension of the shank portion of one of the screws therethrough and adapted to be in frictional contact with the shank portion of said one of the screws, and an outer periphery which is surrounded by and which is spaced-apart from the confining wall of the respective one of the openings. The positioning hole has a size smaller than the head portion of the screws so that the positioning ring is adapted to permit the head portion of said one of the screws to rest thereon when said one of the screws extends through the positioning hole. The connecting ribs extend radially and integrally between the outer periphery of a respective one of the positioning rings and the confining wall of the respective one of the openings. The connecting ribs are breakable to permit the respective one of the positioning rings and the screw that extends through the respective one of the positioning rings to separate from the elongated strap.

BRIEF DESCRIPTION OF THE DRAWINGS

Other features and advantages of the present invention will become apparent in the following detailed description of the preferred embodiments with reference to the accompanying drawings, in which.

DETAILED DESCRIPTION OF THE PREFERRED EMBODIMENTS

Figure 1:
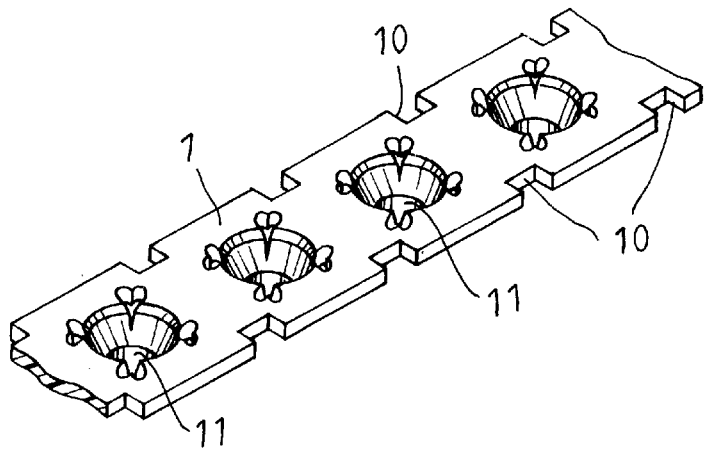
FIG. 1 is a fragmentary perspective view of a conventional screw feed belt.
Figure 2:
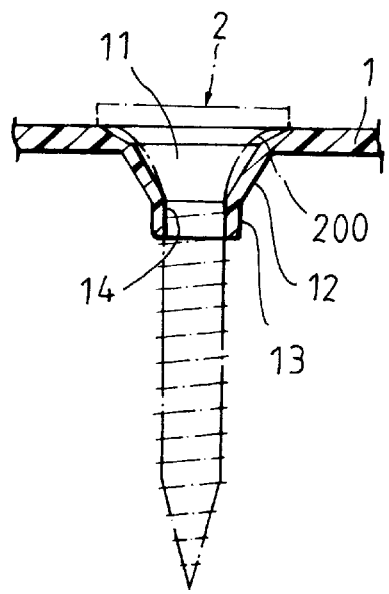
FIG. 2 is a fragmentary sectional view of the conventional screw feed belt.
Figure 3:
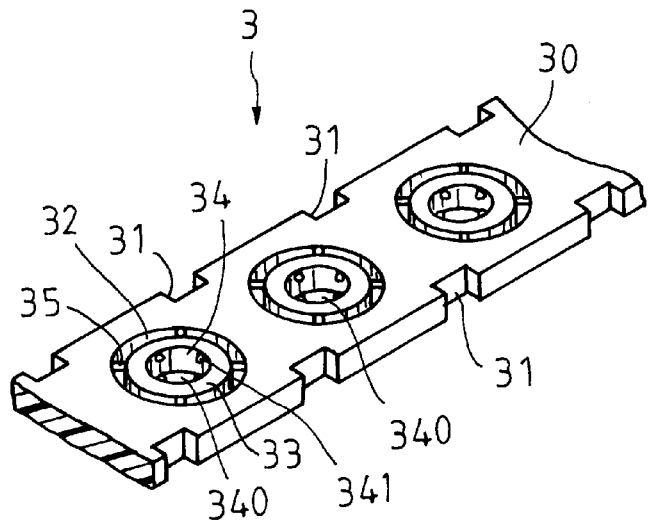
FIG. 3 is a fragmentary perspective view of a first preferred embodiment of a screw feed belt according to the present invention.
Figure 4:
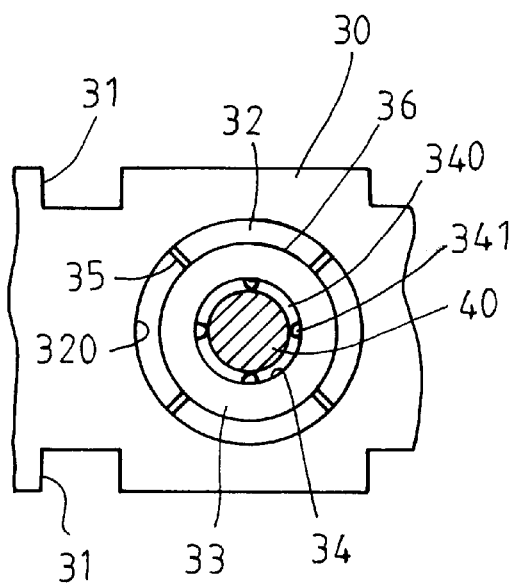
FIG. 4 is a fragmentary schematic top view of the first preferred embodiment.
Figure 5:
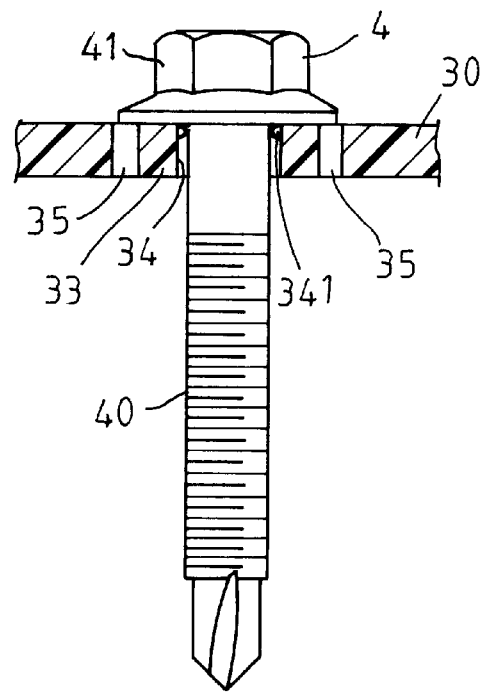
FIG. 5 is a fragmentary sectional view of the first preferred embodiment.

Referring to FIGS. 3 to 5, the first preferred embodiment of the screw feed belt 3 according to the present invention is shown to include an elongated strap 30 which is formed from a flexible material, such as plastic, and which is formed with a plurality of pairs of guiding notches 31 at longitudinal sides thereof, and a plurality of spaced-apart and aligned openings 32 along the length thereof. Each of the openings 32 is circular in shape and is defined by an annular confining wall 320. A plurality of positioning rings 33 are disposed respectively in the openings 32. Each of the positioning rings 33 has an inner periphery 34 that defines a circular positioning hole 340 to permit extension of the shank portion 40 of a screw 4 therethrough, and an outer periphery 36 that is surrounded by and that is radially spaced-apart from the confining wall 320 of the corresponding opening 32. Each of the positioning holes 340 has a size smaller than the head portion 41 of the screw 4 such that the head portion 41 can rest on the respective positioning ring 33 when the shank portion 40 extends through the respective positioning hole 340. Preferably, the positioning rings 33 are smaller than the head portion 41 of the screws 4. The inner periphery 34 of each of the positioning rings 33 is formed with a plurality of radially inward retaining protrusions 341 which are adapted to contact frictionally the shank portion 40 of the screw 4 that is extended through the positioning hole 340. A plurality of connecting ribs 35 extend radially and integrally between the outer periphery 36 of a respective one of the positioning rings 33 and the confining wall 320 of the corresponding opening 32.

In use, the shank portion 40 of the screw 4 is extended through the positioning hole 340 of one of the positioning rings 33 such that the head portion 41 rests on the positioning ring 33. The shank portion 40 can contact frictionally the protrusions 341 for retention on the screw feed belt 3. The connecting ribs 35 have a strength sufficient to support the weight of the screw 4 on the positioning ring 33 without breaking.

When a screw driving machine (not shown), such as an electric drill, is operated to drive axial rotation of the screw 4, the connecting ribs 35 break to permit the respective positioning ring 33 and the screw 4 that extends through the respective positioning ring 33 to separate from the elongated strap 30. The positioning ring 33 is thus sleeved on the shank portion 40 of the screw 4 adjacent to the head portion 41 to serve as a washer for the screw 4. Therefore, the additional step of sleeving a washer on the screw 4 in advance of the driving operation can be obviated.

Figure 6:
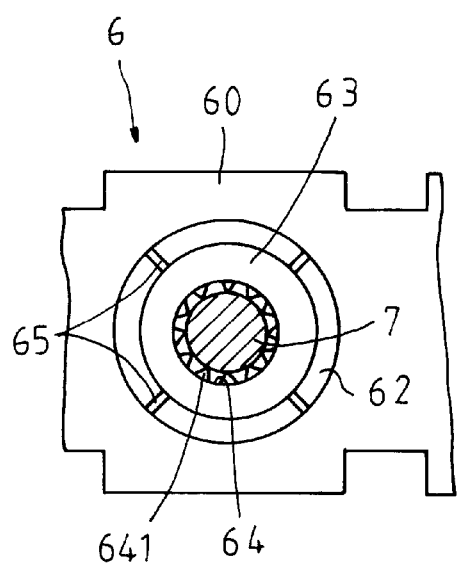
FIG. 6 is a fragmentary schematic top view of a second preferred embodiment of the screw feed belt according to the present invention.

Referring to FIG. 6, the screw feed belt 6 of the second preferred embodiment according to the present invention also includes an elongated strap 60 formed with a plurality of spaced-apart and aligned openings 62, a plurality of positioning rings 63 disposed respectively in the openings 62 to define a plurality of positioning holes 64 therein, and a plurality of radial connecting ribs 65 extending between an outer periphery of a respective one of the positioning rings 63 and an annular confining wall of the respective opening 62. The screw feed belt 6 differs from the screw feed belt 3 of the previous embodiment in that the inner periphery of each of the positioning rings 63 is formed with a plurality of teeth 641 that extend into the positioning hole 64 for contacting frictionally the shank portion of a screw 7 so as to retain the screw 7 on the screw feed belt 6.

The screw feed belt 3, 6 of the present invention is suitable for holding screws 4, 7, such as roofing screws, that require washers. Since the positioning ring 33, 63 is sleeved on the shank portion of the screw 4, 7 when the positioning ring 33, 63 separates from the elongated strap 30, 60 due to the driving operation of the screw driving machine on the screw 4, 7, an additional washer sleeving operation can be obviated. The screw driving operation is thus simplified.

With this invention thus explained, it is apparent that numerous modifications and variations can be made without departing from the scope and spirit of this invention. It is therefore intended that this invention be limited only as indicated in the appended claims.

I claim:

1. A screw feed belt for holding a plurality of screws, each having a shank portion and a head portion on one end of the shank portion, said screw feed belt comprising:

an elongated strap made of a flexible material and formed with a plurality of spaced-apart and aligned openings, each of which is defined by an annular confining wall;

a plurality of positioning rings respectively disposed in said openings, each of said positioning rings having an inner periphery that defines a positioning hole adapted to permit extension of the shank portion of one of the screws and that is adapted to be in frictional contact with the shank portion of said one of the screws, and an outer periphery which is surrounded by and which is radially spaced-apart from said confining wall of the respective one of said openings, said positioning hole having a size smaller than the head portion of the screws so that said positioning ring is adapted to permit the head portion of said one of the screws to rest thereon when said one of the screws extends through said positioning hole; and a plurality of connecting ribs which extend radially and integrally between said outer periphery of a respective one of said positioning rings and said confining wall of a corresponding one of said openings, said connecting ribs being breakable to permit the respective one of said positioning rings and the screw that extends through the respective one of said positioning rings to separate from said elongated strap, wherein said inner periphery of each of said positioning rings is formed with a plurality of radial inward retaining protrusions which are adapted to frictionally contact the shank portion of said one of the screws that is extended through said positioning hole.

* * * * *